United States Patent [19]

Lindskog et al.

[11] Patent Number: 5,068,005

[45] Date of Patent: Nov. 26, 1991

[54] PACKAGING CONTAINER OPENING FORMATION DEVICE FOR A PACKING MACHINE

[75] Inventors: Carl G. Lindskog, Malmoe; Rolf Anderson, Hoor; Christer Loovv, Lund, all of Sweden

[73] Assignee: AB Tetra Pak, Lund, Sweden

[21] Appl. No.: 443,467

[22] Filed: Nov. 29, 1989

[30] Foreign Application Priority Data

Nov. 30, 1988 [JP] Japan ............................ 63-304563

[51] Int. Cl.[5] ............................ B32B 31/18

[52] U.S. Cl. ............................ 156/514; 156/252; 156/253; 229/103.1; 229/123.2; 229/125.15

[58] Field of Search ............... 156/261, 263, 270, 513, 156/514, 252, 253; 53/133, 412; 493/85, 114, 121, 128, 129, 130, 131, 134, 135, 151, 212, 264; 206/222, 605, 620, 630, 633, 824; 220/257, 258

[56] References Cited

U.S. PATENT DOCUMENTS

| | | | |
|---|---|---|---|
| 3,336,845 | 8/1967 | Lepisto et al. | 156/514 |
| 3,676,251 | 7/1972 | Young et al. | 156/514 |
| 4,223,789 | 9/1980 | Reil | 206/633 |
| 4,312,450 | 1/1982 | Reil | 206/605 |
| 4,653,250 | 3/1987 | Nakamura | 53/412 |
| 4,792,069 | 12/1988 | Nantin et al. | 206/633 |
| 4,840,270 | 6/1989 | Caputo et al. | 220/258 |
| 4,858,766 | 8/1989 | Tsai | 206/633 |

*Primary Examiner*—Caleb Weston

*Attorney, Agent, or Firm*—Koda and Androlia

[57] ABSTRACT

A device for forming webs used for packaging containers with and without a pull-tab including, along the conveyance path of a web conveyed at a constant interval, a punch hole opening section for opening liquid-outlets, a strip tape pasting section which closes punch holes opened on a web with a wide strip tape or pastes narrow strip tape on a web having no punch holes, and a pull-tab pasting section having a pull-tab tape cutting and heating depositing member which cuts and heat-deposits a pull-tab on the web provided on the punch holes. Either a wide strip tape or a narrow strip tape is selectively supplied to the strip tape pasting section, and a pull-tab tape is supplied to the pull-tab pasting section. The punch hole opening section and the pull-tab pasting section can be inactivated. Thus, containers with and without a pull-tab can be manufactured by a single web forming device.

8 Claims, 7 Drawing Sheets

PACKAGING CONTAINER OPENING FORMATION DEVICE FOR A PACKING MACHINE

BACKGROUND OF THE INVENTION

1. Field of the Invention

The present invention relates to a device for forming and sealing the openings in a web used for packaging containers for liquid food such as milk, etc.

2. Prior Art

Paper containers commonly called "packaging" containers as shown in FIG. 12 and 16 are used for vending juice, milk, etc. As shown in FIG. 15, a packaging web 1 for such a container is usually made up of support paper $1_1$ with a metal foil layer $1_2$ such as aluminum foil on one side; the surface of the metal foil layer $1_2$ and the other surface of the paper $1_1$ being laminated with a thin polyethylene layer $1_3$.

At least three types of packaging containers are known to meet the demands of the market:

The first type (see FIG. 16) is a container with a straw hole 6 provided on the top surface, in which the straw hole 6 as seen in FIG. 16, is closed beforehand by laminating it with a polyethylene layer $1_3$ and a metal layer $1_2$ so that the liquid food-stuff inside may easily consumed using a straw by piercing the closed straw hole with a straw;

The second type of container is one in which a triangle flap on the upper corner of the container is raised and cut with scissors to form a liquid-outlet hole; and The third type is a container with a liquid-outlet hole covered with a pull-tab *7a* as shown in FIG. 12. In this type of container, the hole 5 is punched out and the inner portion of the liquid-outlet hole 5 is sealed with a strip tape 2 to make the container liquid-tight. The pull-tab *7a* is heat-sealed on the outside of the container so that the liquid-outlet hole 5 is opened when the pull-tab *7a* is peeled off of the container along with the strip tape 2 which the punch hole from inside of the container.

In order to form the straw hole 6 on the container, conventional devices use the following method: Folding lines are first provided on a long, rolled paper of a prescribed width, and after forming an opening (small diameter punch hole 6) to be used as a straw hole at regular intervals 1, the polyethylene layer $1_3$ is laminated on one side of the base paper $1_1$ and the aluminum layer $1_2$, and a polyethylene layer $1_3$ on top of it are laminated on the other side of the base paper $1_1$ by a laminating machine so that the punch hole 6 is closed (see FIG. 13 and FIG. 15). Thus, a web 1 is formed, and this web is supplied to the packing machine. One side edge of the web 1 continuously carried to the filling section is heated, and then a strip tape 3, that covers the edge of the web 1 when forming the web 1 into a cylindrical shape by connecting the two edges in the longitudinal direction of the web, (see FIG. 14) and thus forming the web into a cylinder while continuously running. After the containers are filled, the web 1 is cut to form individual packaging containers with straw hole openings. The above mentioned process also applies to the type of container which has a liquid-outlet opening which is opened by cutting with scissors, except that this type of container does not have a straw hole.

For a container having a pull-tab, folding lines are formed on a long rolled paper without opening the liquid-outlet, and the paper is formed into a packaging web 1 by laminating it as described above (see FIG. 8 wherein the folding lines of the web 1 are omitted). The pull-tab opening device is formed at a prescribed position on the packaging web 1 that is being intermittently conveyed. The web 1 having with the opening device is folded while the web 1 is continuously conveyed, and both edges of the web 1 in the longitudinal direction are pasted, after which it is filled with a liquid food-stuff, cut and formed to make a container.

In this case, the opening device is formed on the web 1 so that the intermittently conveyed web 1 provided with punch holes 5 which make up the liquid-outlet with constant intervals of 1 (see FIG. 9). After a wide strip tape 2 that covers the punch hole 5 is overlapped and heated and deposited at a prescribed position on one edge of the pierced web (see FIG. 10), and a pull-tab *7a* of a prescribed length is joined by heat to the back of the web to close the punch hole 5 (see FIG. 11).

For heating and depositing the strip tape 2 on the web 1, a high-frequency induction heat coil is currently used. For connecting the pull-tab *7a* to the web 1, a pull-tab *7a* is cut out from the pull-tab tape and joined by heat on the bottom surface of the web 1. This is accomplished between a heating body equipped with a cutting means which moves up and down synchronously with an intermittently moving web 1 and a receptacle positioned above the path of the web 1.

When manufacturing containers having straw holes and containers having the liquid-outlet opening which is cut to open, at the time when the strip tape 3 is pasted, the packaging web 1 is continuously conveyed with the folding lines of the web adjusted with the web conveyance timing. When pull-tab containers are manufactured, on the other hand, since a pull-tab is provided on a web while the web is continuously conveyed (though in the filling section the folding lines of the web is adjusted with the web conveyance timing), the web is conveyed intermittently in the pull-tab mounting section. Accordingly, it is difficult for one machine to manufacture containers with different types of openings, that is, pull-tab openings and non-pull-tab openings.

For non-pull-tab opening containers such as those having a straw hole opening, there is no need to form a hole for the pull-tab opening device or to cover such opening; therefore, a narrow strip tape is used. For pull-tab opening containers, however, in addition to the original purpose of pasting both edges of the web, a strip tape is used to seal the liquid-outlet hole. Thus, a wide strip tape is used. Moreover, the pull-tab must be pasted from a direction opposite to the side where the strip tape is pasted, and for this purpose, additional devices are required in the web conveyance path which leads to the filling section of the packing machine.

In other words, a packing machine with an opening formation device to form a pull-tab opening device and a machine with a simple strip tape pasting device are both required.

It is possible to modify a machine having a simple strip tape pasting device into a machine having a pull-tab opening formation device with optional equipment, but such a modification is not easily done.

SUMMARY OF THE INVENTION

The present invention was conceived with the above prior art devices in mind, and the purpose is to provide a device for forming an opening on a packaging container web in a packing machine in which a single device (without any additional or optional equipment) can switch from the manufacture of packaging containers with a pull-tab to the manufacture of packaging containers without a pull-tab (such as a container with a straw hole).

In order to accomplish the object of the present invention, the device of the present invention includes, along the path of an intermittently conveyed packaging web:

a punch hole opening section having a punch to open liquid-outlet holes on a packaging web, such section being arranged so that it can withdraw from the punch hole opening position to a non-opening position;

a strip tape pasting section comprising a flat heating member and a pressure plate that is freely pressable to the heating member provided facing each other across the web conveyance path, the heating member and the pressure plate being able to be switched with another heating member and pressure plate depending on the width of a strip tape (a wide strip tape for the web provided with punch holes and a narrow strip tape for the web having straw holes covered with plastic film);

a pull-tab pasting section provided downstream of the strip tape pasting section, the cutting and heating members thereof being provided on the opposite side of the strip tape across the conveyance path so as to cut a pull-tab out of a pull-tab tape and heat-deposit it on the web; the pull-tab pasting section being able to withdraw to a non-active position;

a strip tape supply means which selectively guides and supplies wide and narrow strip tapes to a prescribed position of the strip tape pasting section; and a pull-tab tape supply means which supplies the pull-tab tape to the pull-tab pasting section.

Thus, the device of the present invention allows for the manufacture of packaging containers with a pull-tab opening device and packaging containers without a pull-tab opening device (such as a container with a straw hole).

The punch hole opening section is provided with a lever that has a punch at one end for opening a liquid-outlet hole. The lever is pivotal and has a cam roller that interlocks with the cam of the main shaft of the device so that the axial position of the cam roller with regard to the pivotal center of the lever is adjustable.

The strip tape supply means has a pair of reel supports that allow switching between a reel for the wide strip tape and a reel for the narrow strip tape. The strip tape supply means further includes several guide rollers that allow the strip tape (both wide and narrow tapes) to be smoothly fed to the strip tape pasting section via the tape conveyance path.

Each of the guide rollers used in the strip tape conveyance path has a narrow groove in the center and wide grooves next to it so that both narrow and wide strip tapes can be guided by a single type of guide roller.

The strip tape supply means has rollers which are positionally fixed near the reel supports for the strip tapes and a pivotal lever that contains the same number of guide rollers as the positionally fixed rollers. With this structure, when the tape is fed through these rollers, the pivotal movement of the lever is detected by a proximity switch so that feed-out of the tape from the tape reel is properly controlled by the reel support's brake means.

The pull-tab pasting section includes a lever which pivots and moves a pull-tab tape cutting and heating member up and down to cut the pull-tab tape and heat-paste the pull-tab to the web. The pull-tab pasting section further includes an air cylinder which withdraws the cutting and heating member from the pull-tab cutting and pasting position.

It is effective to use a claw member which anchors the tip of the pull-tab tape to prevent free movement of the tape when the pull-tab tape is not used.

With the above described structure, the punch hole opening section and the pull-tab pasting section are activated or inactivated depending on which type of containers are being manufactured.

In the manufacture of packaging containers with a pull-tab opening device, the punch hole opening section and the pull-tab pasting section are activated. As for the heating member and the pressure plate of the strip tape pasting section, those for the wide strip tape are selected. Also, the wide strip tape is installed in the strip tape supply means so that the wide strip tape is guided to the strip tape pasting section.

On the other hand, in the manufacture of packaging containers without a pull-tab opening device (such as a packaging container with a straw hole), the punch hole opening section and pull-tab pasting section are deactivated. For the heating member and the pressure plate of the strip tape pasting section, those for the narrow strip tape are selected. Also, the narrow strip tape is installed in the strip tape supply means so that the narrow strip tape is guided to the strip tape pasting section.

In this case, by shifting the position of the cam roller of the lever having the punch away from the cam position of the main shaft of the device, the punch hole opening section can be set in an inactive (or non-hole-opening) position.

By switching between the wide strip tape reel (for the manufacture of packaging containers with a pull-tab opening) and the narrow strip tape reel (for the manufacture of packaging containers without a pull-tab opening such as a container with a straw hole), and using the strip rollers that are suited for both wide and narrow strip tapes in the strip tape conveyance path, the tape can be conveyed to a prescribed position of the strip tape pasting section smoothly without deviation By supplying the (selected) strip tape around the guide rollers provided near one of the reel supports having fixed axles, and around the guide rollers provided on a pivotal lever so that the tape runs from the guide roller on one side to another guide roller on the other side, the intermittent movement of the strip tape on the web and intermittently conveyed is absorbed gradually between the guide rollers whose relative positions can constantly change. When the pivotal motion of the lever becomes great, the proximity switch functions to increase the braking power of the reel. Thus, the feed amount of the strip tape from the reel can be unified, and tension applied to the tape is also unified.

The pull-tab tape cutting and heating member of the pull-tab pasting section can withdraw from an activated position via the air cylinder.

The claw member provided near the conveyance path of the pull-tab tape can be used to prevent uncontrolled movement of the free end of the pull-tab tape by anchoring the end of the pull-tab tape.

BRIEF DESCRIPTION OF THE DRAWINGS

FIG. 6(*b*) shows a guide roller used for a narrow strip tape;

FIG. 6(*c*) shows a guide roller used for both wide and narrow strip tapes;

DETAILED DESCRIPTION OF THE INVENTION

The present invention will now be described with reference to the accompanying drawings.

Figure 1:
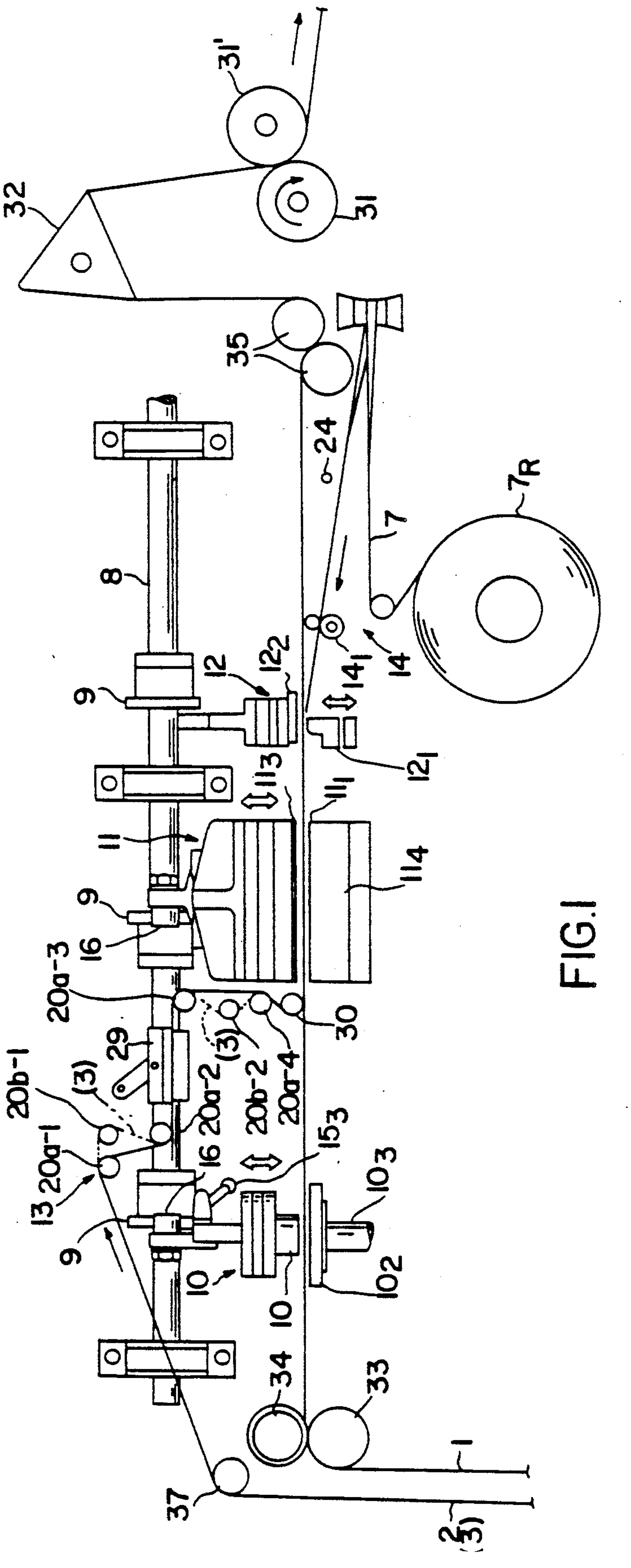
FIG. 1 is a front view schematically showing the main part of the device in accordance with the present invention.

FIG. 1 schematically shows the main sections of the device of this invention. The device is installed in a conveyance path of a packaging web which leads to the filling section of a packing machine.

A web 1 conveyed upward from a packaging web reel (not shown) provided in the lower left hand side of FIG. 1 changes its direction to the horizontal direction via a bending roller 33. The web 1 then passes through each processing section of this device, i.e., a punch hole opening section 10, a strip tape pasting section 11, and a pull-tab pasting section 12 as well as a pair of bending rollers 35.

After this, folding lines formed on the web 1 are aligned by a web folding wheel 32 that is provided at an upper section, and with the folding lines adjusted, the web 1 is further intermittently conveyed between a drive roller 31 which is intermittently rotated by a drive motor (not shown) and an opposing counter roller 31+. Thereafter, the web 1 is conveyed to the filling section, its conveyance being controlled by a vertically moving dancing-roller in a control magazine (not shown).

At the web direction-changing section that changes the direction of conveyance of the web 1 to the horizontal direction as mentioned above, a brake wheel 34 is provided so that it brakes the advancement of the packaging web 1 which is intermittently conveyed towards the right side in the drawing. By so doing, adequate tension is applied to the web 1 with its folding lines adjusted by the folding wheel 32 so that adequate tension is applied to the web 1. Thus, a stable position is maintained for the web 1 at each processing section 10, 11 and 12 during processing.

The web 1 first passes the punch hole opening section 10 punch opens liquid-outlet holes 5 on the web 1 (depending on the work to be done) after changing its advancement to the horizontal direction.

Figure 2:
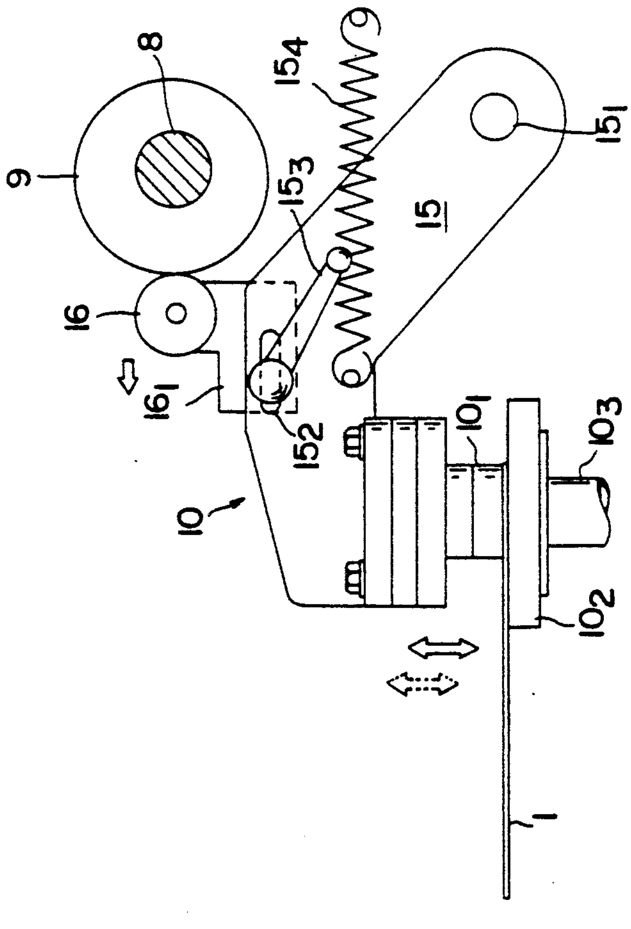
FIG. 2 is a side view of the punch hole opening section of the device.

The punch hole opening section 10, as shown in FIG. 2, is provided with a fixed die $10_2$ beneath the path of the web 1, and above it a vertically moving punch $10_1$ is provided at the end of a pivotal lever 15 that pivots around a fixed shaft $15_1$. An oblong window $15_2$ is provided in the upper section of the lever 15, and the lower part of a roller base $16_1$ is located on the back of the window $15_2$. On this roller base $16_1$, a cam roller 16 is provided so that it interlocks with a cam 9 provided on a main shaft 8 of the device. A screw at the top end of a handle $15_3$ is inserted into the window $15_2$ and linked to the roller base $16_1$ so that the roller base $16_1$ is coupled to the lever 15 by operation of the handle $15_3$ at any position of the handle $15_3$ in the window $15_2$. A spring $15_4$ having its one end anchored to the lever 15 energizes the lever 15 to rotate clockwise so that the cam roller 16 is constantly pressed against the cam 9 of the main shaft 8 so that the lever 15 pivots when the main shaft 8 rotates.

When packaging containers with a pull-tab opening device are to be manufactured, the position of the handle $15_3$ in the window $15_2$ is adjusted so that the cam roller 16 is fixed to the lever 15 and the punch $10_1$ performs the prescribed hole opening (or punching-out) action via the lever 15.

When packaging containers without a pull-tab opening device such as a container with a straw hole, are manufactured, the cam roller 16 is set on the lever 15 so that the cam roller 16 is farther apart from the cam 9. Thus, as shown in FIG. 2, the punch $10_1$ moves up and down at a non-opening (or non-punching) position (The solid line arrow and the double-dotted arrow show the hole opening position and the non-opening position of the punch $10_1$, respectively).

Chips made when punching the holes out of the web 1 are collected in a collection bag (not shown) via a discharge pipe $10_3$ extending downward from the fixed die $10_2$.

The strip tape pasting section 11 is provided at a prescribed position downstream of the punch hole opening section 10. Below the path along which the web 1 is conveyed, a flat high-frequency induction heating coil $11_1$, which is a heating member, is mounted exchangeably over a back plate $11_2$ of the upper section of the mount $11_4$. Above the web conveyance path, a pressing plate $11_3$ is provided exchangeably at the bottom of a vertically moving counter jaw $11_5$ via a detachable side member $11_5$. The high frequency induction heating coil $11_1$ and the pressing plate $11_3$ are selectively used by changing the width of its heat coil part and the pressing plate, depending on the type of work, i.e., manufacturing of packaging containers with or without a pull-tab opening device (In other words, the heating coil and pressing plate are replaceable with another heating coil and pressing plate having a size which meets the width of the strip tape used).

Figure 3:
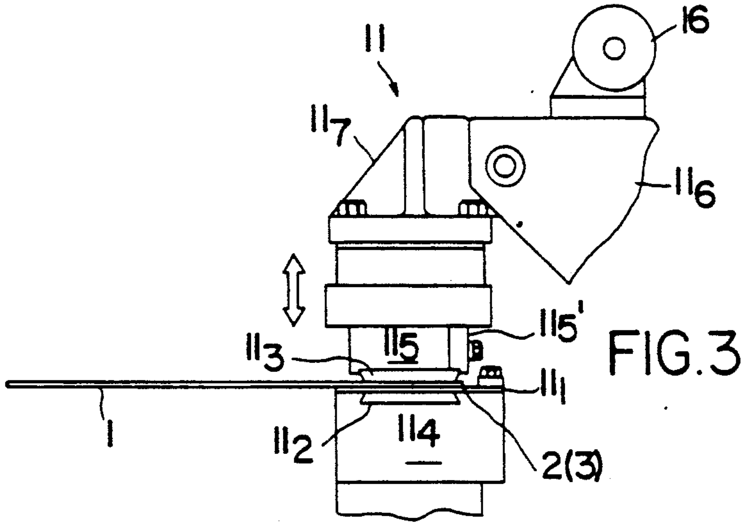
FIG. 3 is a side view of the strip tape pasting section.
Figure 11:
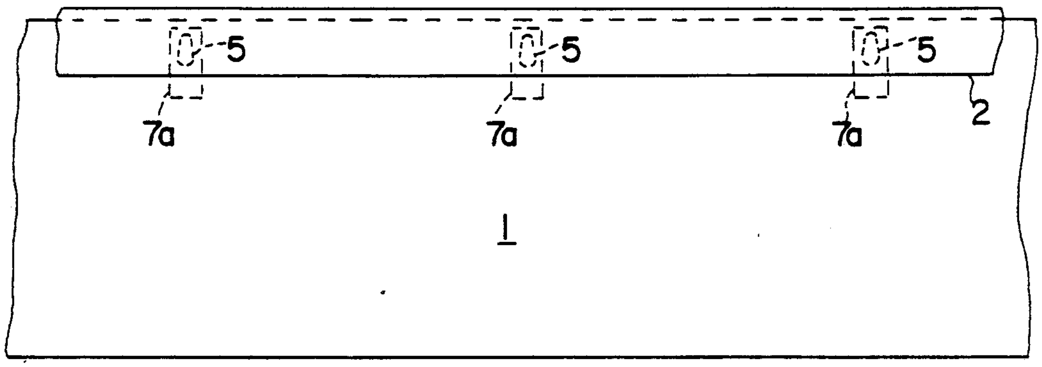
FIG. 11 is a plan view showing a part of a packaging web of FIG. 10 with a pull-tab pasted thereon.
Figure 14:
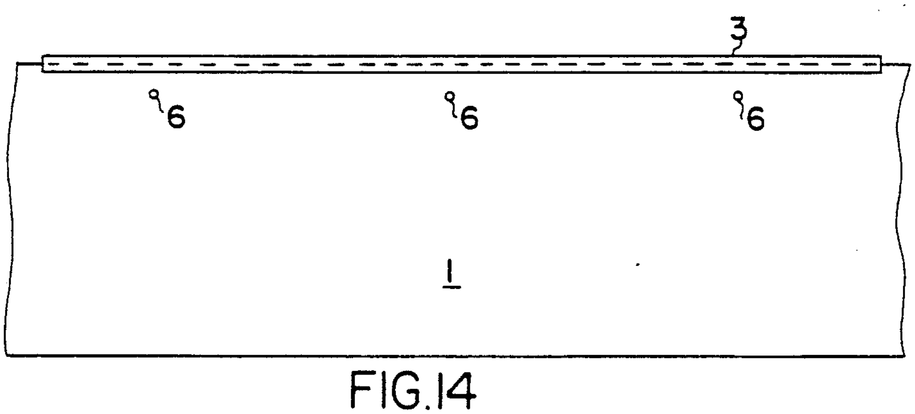
FIG. 14 shows the packaging web of FIG. 13 with a strip tape pasted.
Figure 15:
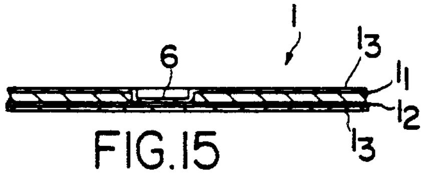
FIG. 15 is an enlarged view of FIG. 13 taken along line XV—XV.

The counter jaw $11_5$ is provided in the lower part of a tip member $11_7$. The tip member $11_7$ is mounted via an axle to the tip of the lever $11_6$ which has a cam roller 16 driven by the cam 9 (see FIG. 1) mounted on the main shaft 8. The lever $11_6$ is connected to an air cylinder (not shown). Thus, the counter jaw $11_5$ makes a prescribed vertical movement when the main shaft 8 rotates (FIG. 3). When the counter jaw moves up and down, the wide or narrow strip tape (2 or 3) guided by the guide rollers will be deposited by high-frequency induction heating on a predetermined position of the web 1 (which has a metallic foil layer) such that the side edge of the tape protrudes a predetermined amount from the side edge of the web 1 as seen in FIG. 11 and FIG. 14.

Either the wide strip tape 2 for a container with a pull-tab opening device or the narrow strip tape 3 for a container without a pull-tab opening device is supplied from a supply reel 36 provided on each of the reel supports (both described later in conjunction with FIG. 5) and are conveyed to the strip tape pasting section 11 after changing its direction at the direction change roller 37.

The strip tape 2 or 3 is then conveyed in the horizontal direction via guide rollers **20*a*-1 and 20*a*-2 (and 20*b*-1 in the case of narrow strip tape 3) and its deviation is regulated between a braking member 29 which has a vertically movable upper part. Then, the direction is changed downward by a guide roller 20*a*-3 and passes a guide roller 20*a*-4 (and 20*b*-2 in the case of narrow tape 3), after which the tape is overlaid on the web 1 by the pressing roller 30 located adjacent to the top surface of the conveyance path of the web 1**.

The web 1 and the tape 2 are passed between the flat high-frequency induction heating coil $11_1$ (which is a heating member of the strip tape pasting section 11) and the pressing rail $11_3$ that moves vertically above the heating coil $11_1$. Thus, the tape 2 or 3 is heat-deposited on the top surface of the intermittently conveyed web 1 with the strip tape 2 or 3 overlaid thereon (see FIG. 1).

Figure 6C:
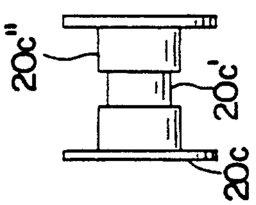
FIG. 6(*a*) shows a guide roller used for a wide strip tape.
Figure 6B:
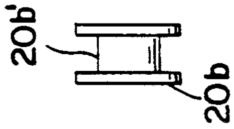
Figure 6A:
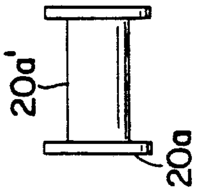

The guide rollers **20*a*-1 through 20*a*-4** are used when manufacturing a container (web) with a pull-tab opening device. As seen in FIG. 6(*a*), each of these guide rollers have a wide groove **20*a*' so as to guide the wide strip tape 2 which closes the liquid-outlet punch hole 5**.

The other guide rollers **20*b*-1 and 20*b*-2 are used when manufacturing a container (web) without a pull-tab opening device (such as a container web having a straw hole). Thus, a narrow groove 20*b*'** is provided as shown in FIG. 6(*b*).

Thus, when using the wide strip tape 2, the narrow guide rollers **20*b* are not used, and the tape 2 runs only on the wide guide rollers 20*a*. When the narrow strip tape 3 is used, it runs on the guide rollers 20*b* having narrow grooves along with the guide rollers 20*a* having wide grooves so that its right and left positions with regard to (the direction of) the tape are aligned to overlap more precisely at a prescribed position on the web 1 by the pressing roller 30**.

Downstream of the strip tape pasting section 11 is the pull-tab pasting section 12. The pull-tab pasting section 12 cuts a pull-tab **7*a* out of a pull-tab tape 7 and heat-pastes (heat-deposits) it onto the bottom surface of the web 1 on which (on the top surface, that is) the wide strip tape 2 has been heat-deposited to close the punch hole 5** via high-frequency induction.

Figure 4:
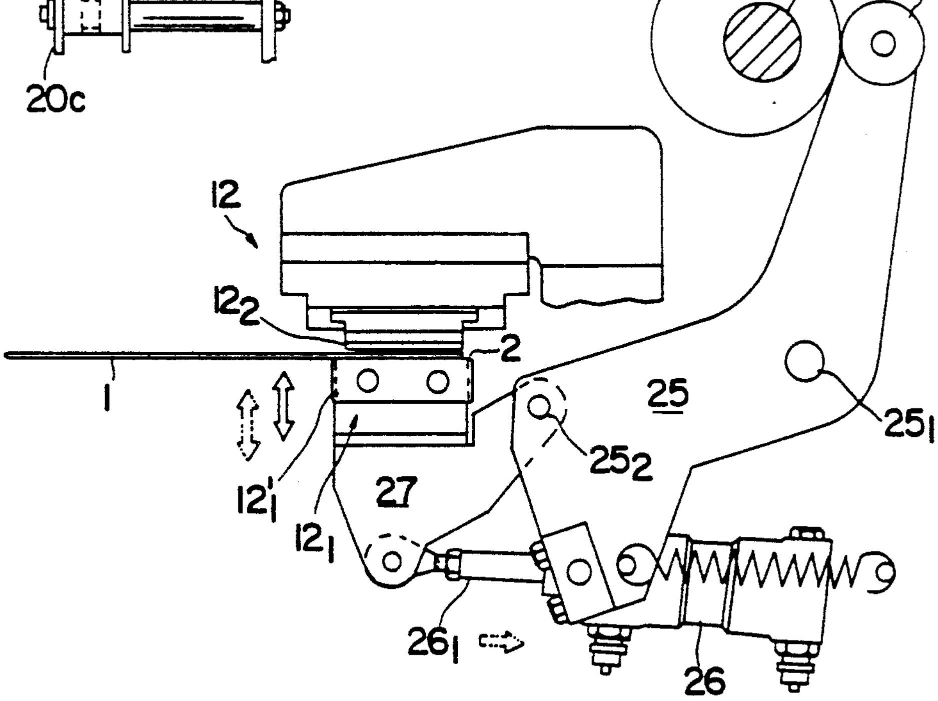
FIG. 4 is a side view of the pull-tab pasting section.

As seen in FIG. 4, under the conveyance path of the web 1, a heating body $12_1$ having a cutting blade $12_1'$ for cutting the pull-tab tape 7 is mounted on the upper part of a rotating member 27. The rotating member 27 is pivotally mounted on axle $25_2$ at the upper part of a lever 25 which has a cam roller 16 interlocking with the cam 9 of the main shaft 8. The tip end of a piston rod $26_1$ of an air cylinder 26 provided under the lever 25 is connected to the rotating member 27. By movement of the electrically controlled piston rod $26_1$ of the cylinder 26, the heating body $12_1$ can be switched between the activation position (shown by the solid line arrow) and the non-activation position (shown by the dotted line arrow) when the lever 25 pivots about the axle $25_1$.

The pull-tab pasting section 12 further includes a pull-tab tape supply means 14 (see FIG. 1) in the downstream of the path of the web 1 conveyed out of the pull-tab pasting section 12. The pull-tab tape supply means 14 draws the pull-tab tape 7 out of a roll 7R and supplies it to the pull-tab pasting section 12 from the downstream side via a supply roller 14.

Adjacent the supply path of the pull-tab tape 7, a claw member 24 is provided. The claw member 24 anchors the end of the pull-tab 7. In other words, the end of the pull-tab tape 7 drawn out from the pull-tab tape supply roller 14 is anchored by this claw member 24 after switching from the manufacture of a container with a pull-tab opening device to the manufacture of a container without a pull-tab opening device. Thus, uncontrolled movement of the end of the pull-tab tape when it is not used is prevented, and the smooth operation of the next step is ensured.

Figure 5:
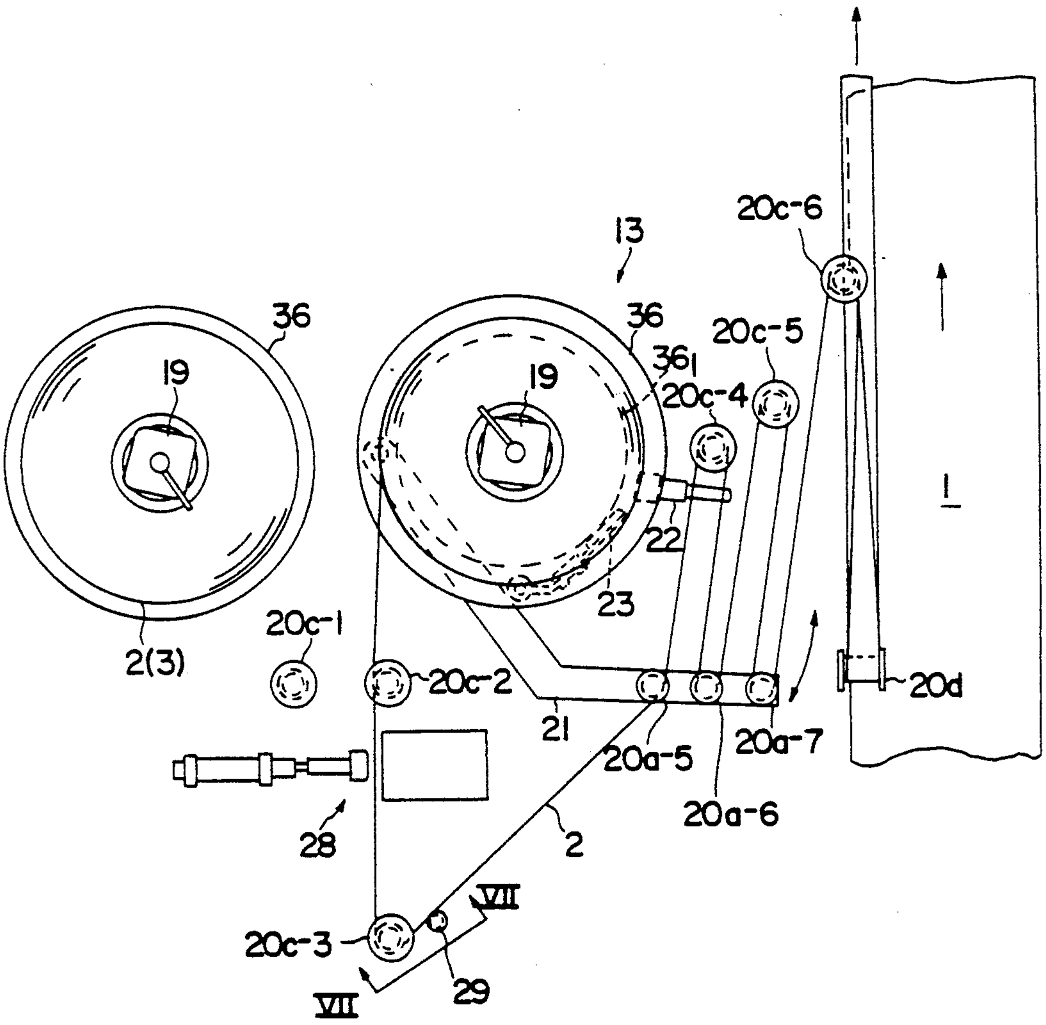
FIG. 5 is a front view showing the strip tape supply means viewed perpendicularly to FIG. 1.

FIG. 5 shows the strip tape (2 or 3) supply means 13. When a strip tape is drawn out from the reel, that is, when either the wide strip tape 2 or the narrow strip tape 3 supported by the reel support 19 (depending on the types of container being manufactured) is reeled out of the reel 36, the strip tape is fed via a lever 21. The strip tape 2 (or 3) is guided by a guide roller **20*c*-2 (or by 20*c*-1) and a splicer 28 positioned below the pair of reel supports 19 and further through a guide roller 20*c*-3 and a guide finger 29 positioned near the guide roller 20*c*-3**.

The tape 2 further advances toward the lever 21 which can pivot around a point **21*a* while being urged downward (clockwise) by a spring (not shown) or its own weight. The tape 2 is then meanderingly suspended between the three guide rollers 20*a*-5, 20*a*-6 and 20*a*-7 provided on the lever 21 and the other three guide rollers 20*c*-4, 20*c*-5 and 20*c*-6 provided on the right side of the reel 36. The axles of the guide rollers 20*c*-4, 20*c*-5 and 20*c*-6 are fixedly positioned. Thus, the tape runs from one guide roller group (20*a*) provided on the pivotal lever 21 to another guide roller group (20*c*) provided above the lever 21**.

After passing the upper right guide roller **20*c*-6, the tape 2 is guided by a guide roller 20*d* whose axis is orthogonal to the guide roller 20*c*-6. Thus, the tape runs upward just like the packaging web 1** which is intermittently conveyed upward.

The guide finger 29 has a narrow groove so that it can guide both the wide and narrow tapes 2 and 3.

When the wide strip tape 2 or the narrow strip tape 3 (the figures only show the wide tape 2) is intermittently conveyed upward, the lever 21 pivots (or shifts) upward (counterclockwise) by being pulled by the tape as the tape advances, and the tape suspended meanderingly between the guide rollers **20*a* and 20*c*** is fed out.

When the tape stops, the lever 21 pivots (or shifts) downward to draw the tape out of the reel 36.

When the tape is conveyed upward, the rollers **20*a* on the lever 21 repeat approaching to and parting from the fixed rollers 20*c*, during which time the intermittent movement is absorbed so that tension from the reel 36** to the tape is uniform and the tape can be drawn out continuously.

When the upward movement of the lever 21 becomes greater, a proximity switch 22 located above the lever 21 and below the guide rollers 20c detects the approach of the lever 21 to the rollers 20c. Then, a brake 23 provided on the back of the reel 36 is activated to increase the friction of the brake drum 36 on the back of the reel 36 so as to control the tape being drawn out from the reel 36. Thus, the tape is drawn out evenly.

Figure 7:
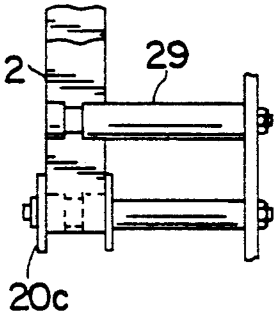
FIG. 7 is an enlarged view of FIG. 5 taken along line VII—VII.
Figure 8:
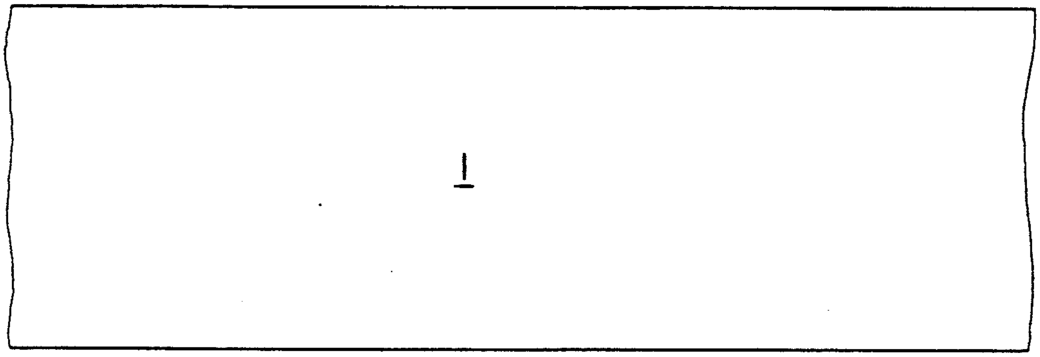
FIG. 8 is a plan view of a part of a packaging web with no holes.

The description above mainly relates to the manufacture of a packaging container with a pull-tab opening device. Thus, the wide strip tape 2 is fed out of the strip tape supply means 13; and the strip tape pasting section 11, the punch hole opening section 10, the pull-tab pasting section 12 and the pull-tab supply means 14 are all activated. (See FIGS. 1, 2, 3, and 4, and the solid-line arrow shown therein). In this case, the wide groove part 20c" of the guide roller 20c is designed so as to be usable for both the wide and narrow tapes (see FIGS. 5, 7, and 6(*c*)) together with guide rollers 20a, which have wide grooves 20a' (see FIGS. 1 and 6(*a*)). As for the high-frequency induction heating coil $\mathbf{11_1}$ and the pressure rail $\mathbf{11_2}$ of the strip tape pasting section 11, a coil and aril are used which match the wide tape 2. As for the web 1, a web with no punch holes and laminated on both sides (having a metal foil layer on one side) is used (see FIG. 8).

Figure 9:
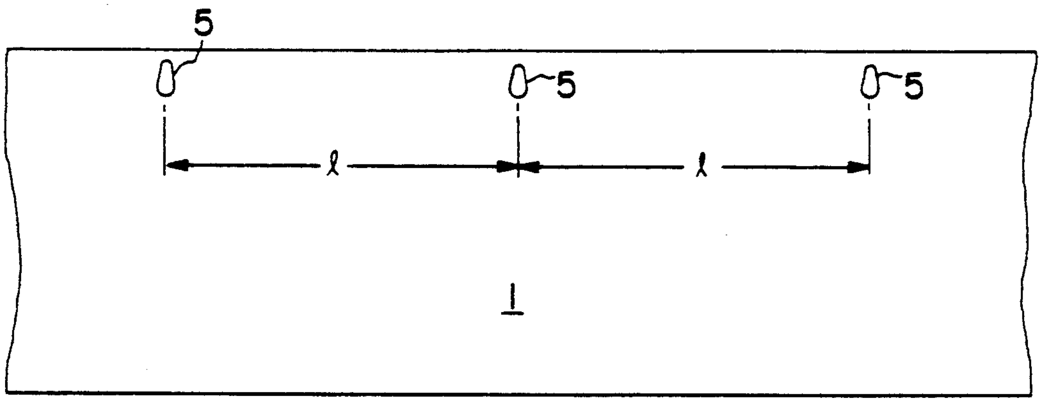
FIG. 9 is a plan view of a part of a packaging web with open punch holes.

In operation, the liquid-outlet punch holes 5 are opened at prescribed intervals 1 on the packaging web 1 which is intermittently conveyed with an interval of 1 (see FIG. 9). The wide strip tape 2, that is guided out of the strip tape supply means 13 by guide rollers 20c and 20a, closes (or covers) the punch holes 5 and is overlapped by the pressure roller 30 so as to protrude a prescribed amount for the purpose of sealing the longitudinal side edges of the web 1 (FIG. 10).

Figure 10:
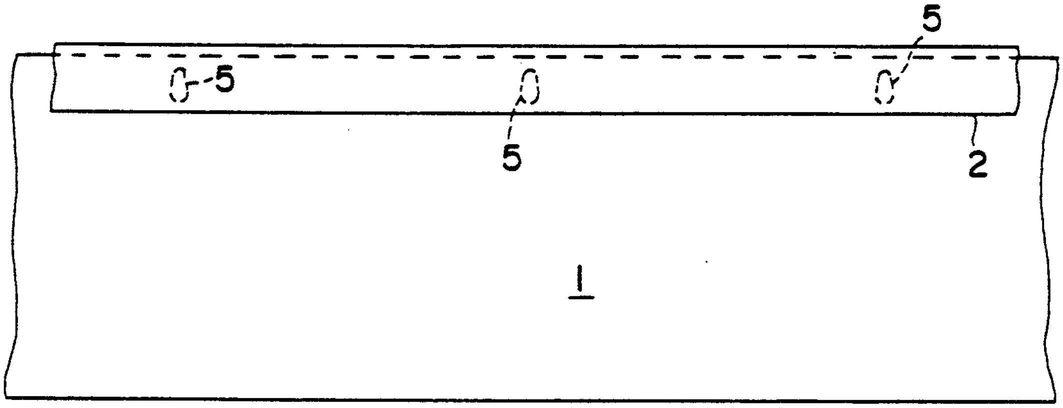
FIG. 10 is a plan view of a part of a packaging web with punch holes which are closed by a pasted wide strip tape.

Furthermore, on the flat high-frequency induction heating coil $\mathbf{11_1}$, the tape 2 is deposited on the web 1 to seal the punch holes 5 by the pressure rail $\mathbf{11_3}$ that moves vertically above the web 1 and synchronously presses the tape (FIG. 10).

Thereafter, the pull-tab opening device is formed on the web 1 (see FIG. 11). Specifically, between the heating body $\mathbf{12_1}$ (which is equipped with a cutting blade $\mathbf{12_1}$ and moves vertically) and the counter rails $\mathbf{12_2}$, the pull-tab *7a* (of a prescribed length cut out from the pull-tab tape 7 that is conveyed by a supply roller $\mathbf{14_1}$ from the pull-tab supply means 14) is heat joined to the undersurface of the web 1.

Figure 12:
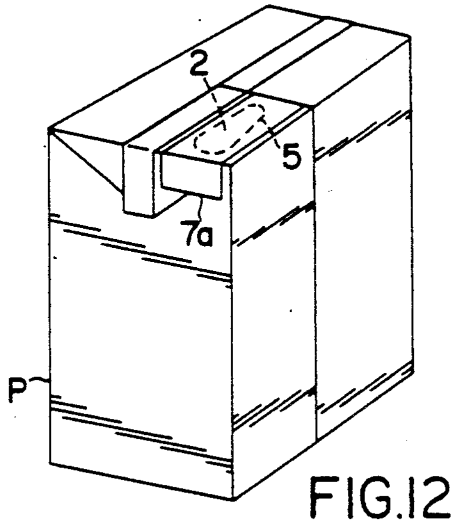
FIG. 12 shows a packaging container with a pull-tab opening device.

The web 1 is then formed into a cylindrical shape in the nest filling section, where it is filled, cut and formed to make a packaging container with a pull-tab opening device (see FIG. 12).

When switching from the manufacture of packaging containers with a pull-tab opening device to the manufacture of packaging containers without a pull-tab opening device (such as packaging containers with a straw hole), a narrow strip tape 3 is used. A roll of the tape 3 is set on the reel support 19 of the strip tape supply means 13, and a narrow circumferential groove part 20c' of the guide roller 20c is used in the strip tape supply means 13. In addition, a guide roller 20b having a narrow groove 20b' together with guide rollers 20a are used (see FIGS. 1 and 6(*b*)).

Figure 13:
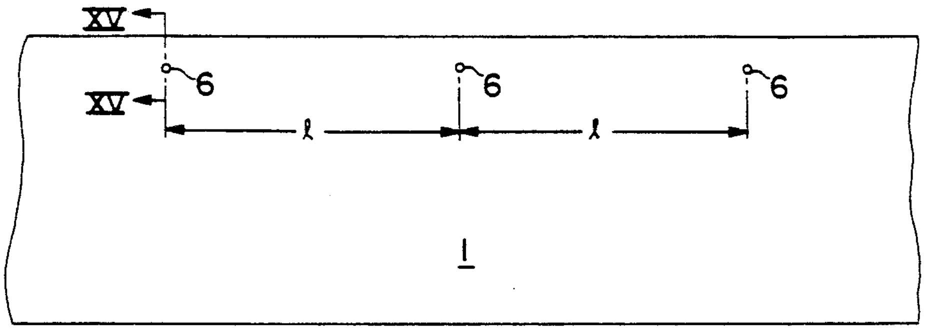
FIG. 13 is a plan view of a part of a packaging web with open straw holes.

In this case the punch hole opening section 11 and the pull-tab pasting section 12 are inactivated as described earlier. The pull-tab tape 7 drawn out from the supply roll $\mathbf{14_1}$ of the pull tab supply means 14 is anchored by the claw member 24. As for the high frequency induction heating coil $\mathbf{11_1}$ and the pressure rail $\mathbf{11_2}$ of the strip tape pasting section 11, those for the narrow tape are used. Thus, the packaging web 1 provided with straw holes and laminated (with a metal foil layer on one side) as shown in FIG. 13 is used.

In this case, when the web 1 which is intermittently conveyed with prescribed pitch 1 reaches at the roller 30, the narrow strip tape 3 guided from above via the guide rollers 20b is overlaid on the web 1 for sealing the longitudinal side edge of the web 1 in such a manner that the tape protrudes a prescribed amount from the edge of the web 1. Then, the tape 3 is pressed between the pressure rail $\mathbf{11_3}$ and the flat high-frequency induction heating coil $\mathbf{11_1}$ of the strip tape pasting section 11 and deposited onto the web 1 (see FIG. 14).

Figure 16:
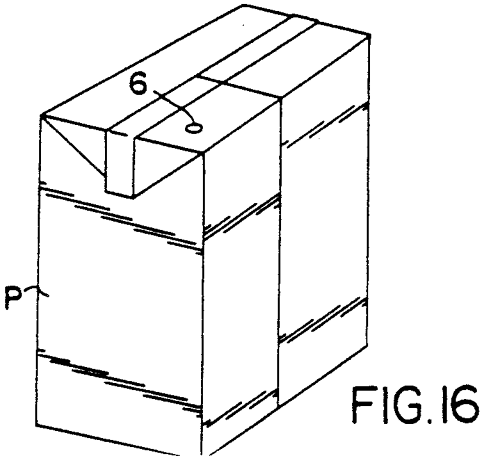
FIG. 16 is a perspective view of a container having a straw hole.

The web 1 adhered with a narrow strip tape with its straw hole 6 closed by lamination is then formed into a cylindrical shape in the filling section, where it is filled, cut and formed to become a packaging container with a straw hole (see FIG. 16).

When switching back from the manufacture of the packaging container without a pull-tab opening device (a container with a straw hole) to the manufacture of a packaging container with a pull-tab opening device, the wide strip tape 2 is used for the strip tape supply means 13. The high-frequency induction heating coil $\mathbf{11_1}$ and the pressure rail $\mathbf{11_3}$ of the strip tape pasting section 11 are replaced with those for the wide tape, and the non-activated punch hole opening section 11 and pull-tab pasting section 12 are switched to an activated condition. In addition, the web 1 without straw holes is replaced with the web 1 having straw holes.

When manufacturing the same type of packaging containers consecutively (and all the tape on the supply reel has been used up), the strip tape (wide or narrow) for the packaging container to be manufactured is connected to the preciously used strip tape using the splicer 28 provided below the reel support 19 of the strip tape supply means 13. When switching to another type of container, the previously used tape is joined with a new tape before the lever 21 using splice tape so that the new tape is drawn out from the area above the strip tape pasting section 11, where the tape is guided by the prescribed guide rollers to the strip tape pasting section.

The guide roller 20a for the wide strip tape, the guide roller 20b for the narrow strip tape, and the guide roller 20c for both the wide and narrow strip tapes can be located at any adequate position which is different from the above description.

In the embodiments, a web having a metal foil layer is used for a web, and a high-frequency induction heating coil is used on the heating member. However, the present invention is not restricted to this, and webs without a metal foil layer and ordinary electical heating member can be used.

As is obvious from above description, the device of the present invention has the following effects:

The device includes, along the conveyance path of the packaging web which is intermittently conveyed at constant intervals, (1) a punch hole opening section for opening a punch hole used as a liquid-outlet, the opening section being shiftable into a non-active (non-hole-opening) position;

(2) a strip tape pasting section provided downstream of the punch hole opening section so that the pasting section closes the punch hole with a wide strip tape or pastes a narrow strip tape on the web which does not have the punch holes, the pasting section including a heating member and pressure plate which are replaceable depending on the width of the strip tape pasted;

(3) a pull-tab pasting section provided downstream of the strop tape pasting section so that a cutting and heating member of the pull-tab pasting section cuts and heat-deposits a pull-tab (cut out of a pull-tab tape), the pull-tab pasting section being activated or inactivated as desired;

(4) a strip tape supply means provided so that a wide strip tape or a narrow strip tape can be selectively guided to the strip tape pasting section; and (5) a pull-tab tape supply means that supplies a pull-tab tape to the pull-tab pasting section.

Accordingly, the manufacture of packaging containers with a pull-tab opening device and the manufacture of packaging containers without a pull-tab opening device (such as a container with a straw hole) can be easily switched.

In other words, the process performed at each section and the guide and supply of the strip tape can be switched quite easily in a short time with a minimum amount of trouble. Therefore, while two lines (for the pull-tab and non-pull-tab containers) of packing machine systems are required conventionally, according to the present invention, a single machine can handle both types of containers, reducing the cost for the equipment. Even when comparing the present invention to one that can be switched by using additional attachments and/or types of equipment known in the prior art, the present invention eliminates trouble and saves time considerably to increase the work efficiency.

The liquid-outlet opening section can be easily switched from the hole opening position to the hole non-opening position by changing or adjusting the mounting position of the cam roller by using a handle, etc.

The guide rollers are provided to guide both the wide strip tape and the narrow strip tape by switching between them and supplying the required strip tape to the strip tape pasting section.

A single type of guide roller which has a groove for the wide tape as well as a groove for a narrow tape is used in the strip tape supply means; therefore, both tapes can be guided on a single guide roller.

The strip tape is conveyed between positionally fixed guide rollers and guide rollers mounted on a pivotal lever; therefore, the intermittent movement of the strip tape which is intermittently drawn out of the guide rollers is gradually absorbed. Also, by detecting the lever movement by the proximity switch and by braking the strip tape supply reel, the tape fed out from the reel and its tension are made uniform so that the tape can be smoothly drawn out from the reel.

The relative position between the pivotal lever and the pull-tab cutting and heating member can be changed via an electrically controlled air cylinder. Thus, the cutting and heating member can be easily inactivated.

The unused pull-tab tape is anchored by the claw member to prevent uncontrolled movement of the tip of the pull-tab tape when manufacturing containers without a pull-tab opening device. Thus, succeeding work can be performed safely.

We claim:

1. A packaging container opening formation device for a packing machine provided along the conveyance path of a packaging web which is intermittently conveyed, comprising:

a punch hole opening section with a punch which opens on said web a punch hole used for a liquid-outlet, said opening section being arranged so that it can withdraw from a punch hole opening position to a punch hole non-opening position;

a strip tape pasting section comprising a heating element and a pressing plate facing each other across said conveyance path of said web, said heating element and pressing plate being switchable respectively with another heating element and pressing plate depending on the width of a strip tape to be used, and said strip tape pasting section closing punch holes opened on said web with a wide strip tape or pasting a narrow strip tape on said web which has no punch holes;

a pull-tab pasting section provided in the downstream of said strip tape pasting section so that a cutting and heating member provided on the side opposite to said strip tape on said web across said conveyance path cuts a pull-tab from a pull-tab tape and heat-deposits it on said web, said pull-tab pasting section being switchable into a non-active position;

a strip tape supply means which supplies wide and narrow strip tapes selectively to said strip tape pasting section; and a pull-tab supply means which supplies said pull-tab tape to said pull-tab pasting section.

2. A device according to claim 1, wherein said punch hole opening section comprises a pivotal lever which has a punch at one end and has a cam roller that interlocks with a cam of a main shaft of said device, a distance between said cam roller and a pivotal center of said lever being adjustable.

3. A device according to claim 1 or 2, wherein said strip tape supply means is provided with reel supports which are exchangeably used between a reel for a wide strip tape and a reel for a narrow strip tape, said supply means further comprising a plurality of guide rollers to guide both wide and narrow tapes to a strip tape conveyance path that leads said strip tapes to said strip tape pasting section.

4. A device according to claim 1 or 2, wherein said strip tape supply means comprises at a prescribed position proximate to said reel support a plurality of guide rollers with the axles positionally fixed and a pivotal lever provided with the same number of guide rollers as said fixed guide rollers, movement of said lever being detected by a proximity switch to control a brake of said strip tape reel.

5. A device according to claim 4, wherein each of said guide rollers except those provided on said pivotal lever has a central groove corresponding to the width of said narrow strip tape and peripheral grooves corresponding to the width of said wide strip tape.

6. A device according to claim 1 or 2, wherein said pull-tab pasting section is provided so that a lever thereof has, on its one end, a cam roller that interlocks with a cam of a main shaft of said device and, on its other end, a cutting and heating member for a pull-tab tape mounted on a rotating plate that is connected to said lever so that said rotating plate can be rotated by the power of an air cylinder mounted on said lever, said cutting and heating member being withdraw from a pull-tab cutting and pasting position by said air cylinder when said lever is activated.

7. A device according to claim 1 or 2, wherein a claw member which anchors a tip of said pull-tab tape that is supplied and stopped is provided adjacent to a conveyance path of said pull-tab tape of said pull-tab tape supply means.

8. A device for forming a web used for packaging containers, said device being provided along a conveyance path of said web intermittently conveyed and comprising:

a punch hole opening section with a punch which opens on said web a punch hole used for a liquid-outlet, said opening section being switchable between a punch hole opening position to a punch hole non-opening position;

a strip tape pasting section provided downstream of said punch hole opening section, said strip tape pasting section comprising a heating element and a pressing plate facing each other across said conveyance path of said web to paste said strip tape to said web, said strip tape pasting section closing punch holes opened on said web with a wide strip tape or pasting a narrow strip tape on said web which has no punch holes;

a pull-tab pasting section provided in the downstream of said strip tape pasting section so that a cutting and heating member thereof cut a pull-tab tape into a pull-tab and heat deposit said pull-tab to said web, said pull-tab pasting section being switchable between an active position and a non-active position;

a strip tape supply means which supplies wide and narrow strip tapes selectively to said strip tape pasting section; and a pull-tab tape supply means which supplies said pull-tab tape to said pull-tab pasting section.

* * * * *